P. K. DEDERICK.
Hay and Cotton Presses.

No. 151,477. Patented June 2, 1874.

WITNESSES:

INVENTOR:
BY
ATTORNEYS.

UNITED STATES PATENT OFFICE.

PETER K. DEDERICK, OF ALBANY, NEW YORK.

IMPROVEMENT IN HAY AND COTTON PRESSES.

Specification forming part of Letters Patent No. 151,477, dated June 2, 1874; application filed December 29, 1873.

*To all whom it may concern:*

Be it known that I, PETER K. DEDERICK, of Albany, in the county of Albany and State of New York, have invented a new and Improved Press, of which the following is a specification:

The invention will first be fully described, and then pointed out in the claims.

Figure 1:
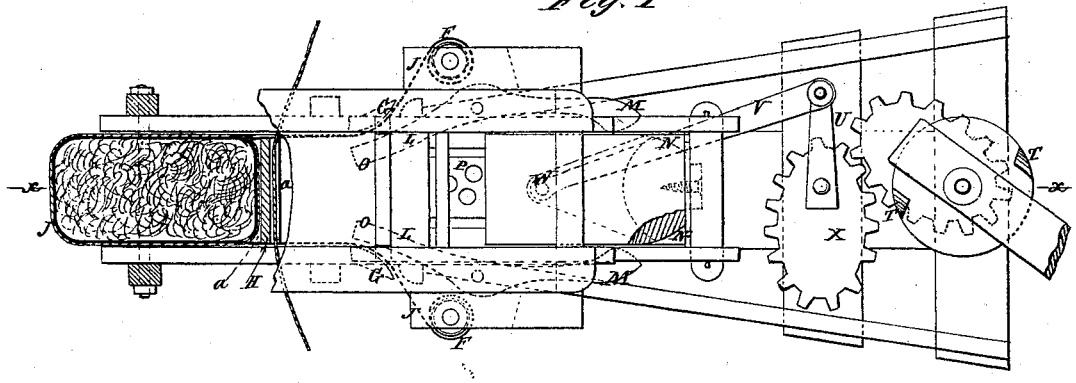
Figure 2:
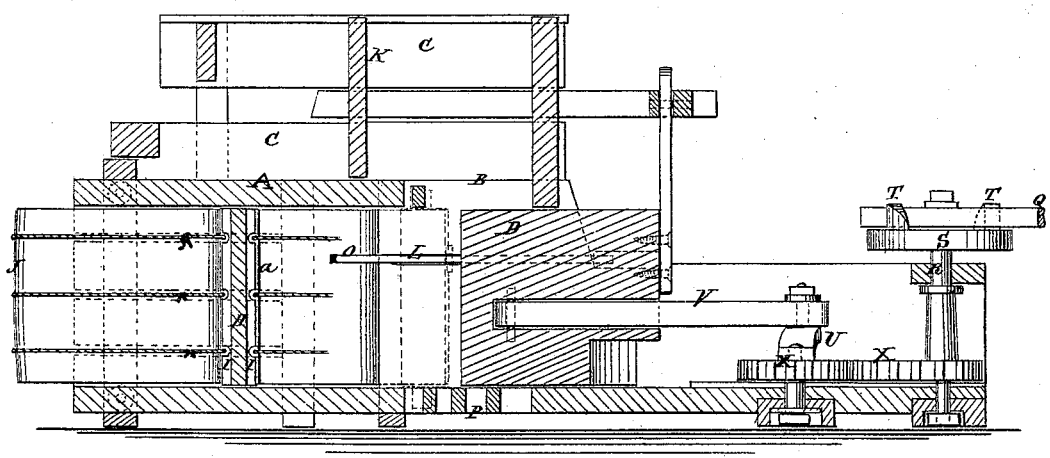

Figure 1 is partly a plan view and partly a horizontal section of my improved press, and Fig. 2 is a longitudinal sectional elevation.

Similar letters of reference indicate corresponding parts.

A represents the horizontal press-case, into which the hay is fed continuously in batches, through the space B at the bottom of the hopper C, in front of the follower D, which works continuously, and compresses a batch at each forward motion against that already pressed in, which is pressed forward a little at each operation, and forced out at the other end, being separated and tied while passing along, all as described in a patent heretofore granted to me for pressing hay, and in another for pressing cotton; but said presses being specially designed, the one for hay and the other for cotton, neither one would do for both hay and cotton, which it is the essential object of this invention to accomplish, and which is effected by the employment of a long compressing-case, the same as in the hay-press, with a cloth roll, F, on each side, and an opening, G, through the case side, for the cloth J, by which the bale is to be sacked, to be drawn in by the cotton which is pressed into it, the cloth being extended from one roller to the other at the beginning of the operation, so as to extend around the first bale, as represented in the drawings, and being cut at the end of each bale after they are tied and discharged from the case. The bales are separated from each other, as in my other presses, by followers H, put in the case through hopper C in advance of the piston, from time to time, as often as a sufficient quantity for a bale has been pressed in. To inclose the ends of the bales, I now attach a piece of sacking, *a*, to each side of these followers before putting them in, and the said pieces to the ends of the bales, by passing the ties through the grooves I in the followers behind said end pieces. As the ties have to be put in before the cloth is cut, I punch holes through the cloth at the followers, and pass the ties through the holes while the bales are passing along in the case, and then tie the bales through slots in the sides of the case, the same as in the original hay-press. Thus the bale is sacked on two sides and the ends, leaving the other two sides to be afterward covered by pieces sewed on; or similar cloth rolls may be employed at top and bottom for covering those sides also.

If the case be made high enough for the length of the bales, which I contemplate, the bales will then be covered on all sides by the two cloth strips at the sides, and the pieces carried on the followers H, leaving only the ends to be covered by sewing on pieces after the bales are discharged.

For condensing the hay or cotton preparatory to the delivery of it in advance of the piston D, so as to lessen the labor of stuffing it in, and also increase the amount of each batch, I now propose to extend the hopper C along over the top of the case, as shown, to largely increase the space for the loose hay, and arrange thereon a follower, K, so connected with the piston D, or the devices for operating it, that it will move back to the left when the piston goes forward to allow the hopper to be filled, and, when the piston returns, will be pulled back to condense the hay or cotton in front of it, and deliver it into the space B. To hold the substance being packed against springing back with the piston D, I now propose to employ one or more levers, L, on each side, pivoted at or about the middle, and so shaped at the ends M, and arranged relatively to the piston, that when it goes back its covers N will force the ends O inward just in advance of the piston and in front of the hay, and thus hold it from following the piston back by expanding. P represents holes, slots, or perforations in the bottom of the case, to allow the dirt, gravel, and seed to fall through and escape from the hay. Q is the sweep, which I now attach to the power-wheel shaft R by pivoting it on the top of the disk S, between the lugs or stops T, which hold it for turning the shaft, but allow of considerable play of the sweep between said studs. The object is to prevent the forward impulse of the power-wheel caused by the reaction on it of the pressed material when the crank U and connecting-rod V pass the right line between the pivot W and the axis of wheel X from throwing the sweep forward against the horse.

Having thus described my invention, I claim as new, and desire to secure by Letters Patent—

1. The combination, with press having side openings G G, of the rolls F F and follower H, substantially as and for the purpose described.

2. The combination of hopper C, extending beyond space D, and the condensing-follower K with the follower of a continuous press, as and for the purpose set forth.

3. The combination, with follower D and press-case, of the levers L, as and for the purpose specified.

PETER K. DEDERICK.

Witnesses:
GEORGE W. MERCHANT,
DAVID DE TIERE.